(12) United States Patent
Shah

(10) Patent No.: US 7,360,717 B2
(45) Date of Patent: *Apr. 22, 2008

(54) GRAPHICAL USER INTERFACE SYSTEM FOR A THERMAL COMFORT CONTROLLER

(75) Inventor: Dipak J. Shah, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 71 days.

This patent is subject to a terminal disclaimer.

(21) Appl. No.: 10/453,027

(22) Filed: Jun. 3, 2003

(65) Prior Publication Data

US 2003/0208282 A1 Nov. 6, 2003
US 2007/0198099 A9 Aug. 23, 2007

Related U.S. Application Data

(63) Continuation of application No. 09/697,633, filed on Oct. 26, 2000, now Pat. No. 6,595,430.

(51) Int. Cl.
F23N 5/20 (2006.01)
G05D 23/00 (2006.01)

(52) U.S. Cl. ............ 236/46 R; 236/94; 165/11.1; 165/238; 700/276

(58) Field of Classification Search ........... 236/46 R, 236/94; 165/238, 11.1; 345/965, 90, 902; 700/276

See application file for complete search history.

(56) References Cited

U.S. PATENT DOCUMENTS

| | | | |
|---|---|---|---|
| 4,224,615 A | 9/1980 | Penz | |
| 4,314,665 A * | 2/1982 | Levine | ............ 236/46 R |
| 4,401,262 A | 8/1983 | Adams et al. | |
| 4,914,568 A | 4/1990 | Kodosky et al. | |
| 4,948,040 A * | 8/1990 | Kobayashi et al. | ........ 236/46 R |
| 5,086,385 A | 2/1992 | Launey et al. | |
| 5,170,935 A | 12/1992 | Federspiel et al. | |
| 5,289,362 A * | 2/1994 | Liebl et al. | ............ 700/22 |
| 5,782,296 A | 7/1998 | Mehta | |
| 5,818,428 A | 10/1998 | Eisenbrandt et al. | |

(Continued)

FOREIGN PATENT DOCUMENTS

DE 3334117.6 4/1985

(Continued)

OTHER PUBLICATIONS

ADI, "Leopard User Manual," 93 pages, 2001.
Adicon 2500, "The Automator," 4 pages, Oct.-Dec. 2000.
ADT Security Services, "iCenter Advanced User Interface 8142ADT," Installation and Setup Guide, 5 pages, May 2001; First Sale Feb. 2001.
Business Wire, "MicroTouch Specialty Products Group to Capitalize on Growing Market for Low-Cost Digital Matrix Touchscreens," p. 1174 (2 pages), Jan. 6, 1999.

(Continued)

Primary Examiner—Marc Norman

(57) ABSTRACT

A graphical user interface system for a thermal comfort controller. The user interface system has a central processing unit coupled to a memory and a touch sensitive display unit. The memory stores a temperature schedule data structure and perhaps a temperature history data structure. The temperature schedule data structure is made up of at least one set-point. The temperature history data structure is made up of at least one Actual-Temperature-Point. The display presents the set-points and/or the Actual-Temperature-Points. One representation of the display is a graphical step-function. The user uses a finger or stylus to program the set-points by pointing and dragging a portion of the step-function.

36 Claims, 2 Drawing Sheets

U.S. PATENT DOCUMENTS

| | | | |
|---|---|---|---|
| 5,873,519 | A | 2/1999 | Beilfuss |
| 5,886,697 | A | 3/1999 | Naughton et al. |
| 5,947,372 | A | 9/1999 | Tiernan |
| 6,020,881 | A * | 2/2000 | Naughton et al. ......... 345/327 |
| 6,059,195 | A | 5/2000 | Adams et al. |
| 6,140,987 | A | 10/2000 | Stein et al. |
| 6,192,282 | B1 | 2/2001 | Smith et al. |
| 6,259,074 | B1 | 7/2001 | Brunner et al. |
| 6,285,912 | B1 | 9/2001 | Ellison et al. |
| 6,290,140 | B1 | 9/2001 | Pesko et al. |
| 6,330,806 | B1 | 12/2001 | Beaverson et al. |
| 6,344,861 | B1 | 2/2002 | Naughton et al. |
| 6,398,118 | B1 | 6/2002 | Rosen et al. |
| 6,478,233 | B1 | 11/2002 | Shah |
| 6,483,906 | B1 * | 11/2002 | Iggulden et al. ....... 379/102.03 |
| 6,578,770 | B1 | 6/2003 | Rosen |
| 6,580,950 | B1 | 6/2003 | Johnson et al. |
| 6,581,846 | B1 | 6/2003 | Rosen |
| 6,595,430 | B1 * | 7/2003 | Shah ....................... 236/46 R |
| 6,619,555 | B2 | 9/2003 | Rosen |
| 6,621,507 | B1 | 9/2003 | Shah |
| 6,786,421 | B2 | 9/2004 | Rosen |
| 2001/0029585 | A1 | 10/2001 | Simon et al. |
| 2001/0042684 | A1 | 11/2001 | Essalik et al. |
| 2001/0052459 | A1 | 12/2001 | Essalik et al. |
| 2002/0092779 | A1 | 7/2002 | Essalik et al. |
| 2003/0142121 | A1 | 7/2003 | Rosen |
| 2003/0150926 | A1 | 8/2003 | Rosen |
| 2003/0150927 | A1 | 8/2003 | Rosen |
| 2004/0074978 | A1 | 4/2004 | Rosen |
| 2004/0245352 | A1 | 12/2004 | Smith |

FOREIGN PATENT DOCUMENTS

| | | |
|---|---|---|
| DE | 3334177 A | 4/1985 |
| DE | 29600654 U | 3/1996 |
| EP | 0 434 926 | 7/1991 |
| EP | 0678204 | 3/2000 |
| EP | 0985994 | 3/2000 |
| EP | 0985994 A | 3/2000 |
| EP | 1074009 | 7/2001 |
| WO | WO 97/11448 | 3/1997 |
| WO | WO 97/39392 | 10/1997 |
| WO | WO9739392 A | 10/1997 |
| WO | WO 01/52515 | 7/2001 |
| WO | WO 01/79952 | 10/2001 |

OTHER PUBLICATIONS

Climatouch, User Manual, Climatouch CT03TSB Thermostat, Climatouch CT03TSHB Thermostat with Humidity Control, Outdoor UHF Temperature Transmitter 217S31, 19 pages, Printed Sep. 15, 2004.

DeKoven et al., "Designing Collaboration in Consumer Products," 2 pages, 2001.

Freudenthal et al., "Communicating extensive smart home functionality to users of all ages: the design of a mixed-initiative multimodal thermostat-interface," pp. 34-39, Mar. 12-13, 2001.

Honeywell News Release, "Honeywell's New Sysnet Facilities Integration System For Boiler Plant and Combustion Safety Processes," 4 pages, Dec. 15, 1995.

Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.

Honeywell, "W7006A Home Controller Gateway User Guide," 31 pages, Jul. 2001.

"Mark of Excellence Award Finalist Announced," http://64.233.167.104/search?Q=cache:ciOA2YtYaBIJ:www.hometoys.com/releases/mar. . ., 6 pages, Leopard Touchscreen on p. 2, dated prior to Mar. 4, 2000, printed Aug. 20, 2004.

"High-tech options take hold in new homes—200-08-28—Dallas Business Journal," http://bizjournals.com/dallas/stories/2000/08/28/focus4, 3 pages, dated Aug. 28, 2000, printed Aug. 19, 2004.

"Product Review—Philips Pronto Remote Control," http://hometheaterhifi.com/volume_6_2/philipsprontoremotecontrol.html, 5 pages, dated May 1999, printed Aug. 20, 2004.

"CorAccess Systems/In Home," http://web.archive.org/web20011212084427/www.coraccess.com/home.html, 1 page, copyright 2001, printed Aug. 19, 2004.

"A Full Range of Alternative User Interfaces For Building Occupants and Operators," http://www.automatedbuildings.com/news/jan00/articles/andover/andover.htm, 5 pages, dated Jan. 2000, printed Sep. 20, 2004.

http://www.cc.gatech.edu/computing/classes/cs6751_94_fall/groupc/climate-2/nodel.html, "Contents," 53 pages, printed Sep. 20, 2004.

"HAI Company Background," http://www.homeauto.com/AboutHAI/abouthai_main.htm, 2 pages, printed Aug. 19, 2004.

Cardio, by Secant; http://www.hometoys.com/htinews/apr98/reviews/cardio.htm, "HTINews Review," Feb. 1998, 5 pages, printed Sep. 14, 2004.

Cardio Manual, available at http://www.secant.ca/En/Documentation/Cardio2é-Manual.pdf, Cardio Home Automation Inc., 55 pages, printed Sep. 28, 2004.

Domotique Secant Home Automation—Web Page, available at http://www.secant.ca/En/Company/Default.asp, 1 page, printed Sep. 28, 2004.

"Vantage Expands Controls For Audio/Video, HVAC and Security," http://www.hometoys.com/htinews/aug99/releases/vantage03.htm, 2 pages, dated Aug. 3, 1999, printed Aug. 20, 2004.

Visor Handheld User Guide, Copyright 1999-2000.

"Home Toys Review—TouchLinc", http://www.hometoys.com/htinews/aug99/reviews/touchlinc/touchlinc.htm, 3 pages, dated Aug. 1999, printed Aug. 20, 2004.

"RC X10 Automation Forum: Control your Heating and Cooling System with Pronto(1/1)," http://www.remotecentral.com/cgi-bin/mboard/rc-x10/thread.cgi?12, 2 pages, dated Apr. 23, 1999, printed Aug. 20, 2004.

Blake et al., "Seng 310 Final Project" Report, dated Apr. 6, 2001.

Blake et al., "Seng 310 Final Project Demo Program" Illustration, 3 pages, Apr. 6, 2001.

"Spotlight on integrated systems," Custom Builder, V8, N2, p. 66(6), Mar.-Apr. 1993.

ADT Security Systems, "iCenter Advanced User Interface 8142ADT User Guide," pp. 1-136, 2001.

DeKoven et al., "Measuring Task Models in Designing Intelligent Products," pp. 188-189, 2002.

http://www.hometoys.com/htinews/apr99/releases/hal01.htm, HTI News Release, pp. 1-3, printed Oct. 28, 2004.

U.S. Appl. No. 10/440,474, filed May 15, 2003, entitled "Reverse Images in a Dot Matrix LCD for an Environmental Control Device."

U.S. Appl. No. 10/654,230, filed Sep. 3, 2003, entitled "Programmable Thermostat Incorporating a Liquid Crystal Display and Having a Feature for Mounting Horizontally, Vertically and any Intermediate Orientation."

U.S. Appl. No. 10/654,235, filed Sep. 3, 2003, entitled "Programmable Thermostat Incorporating a Liquid Crystal Display Selectively Presenting Adaptable System Menus Including Changeable Interactive Virtual Buttons."

Blister Pack Insert from a Ritetemp 8082 Touch Screen Thermostat Product, 2 pages, 2002.

Operation Manual for Ritetemp Touch Screen Thermostat 8082, 8 pages, 2002.

Trouble Shooting Guide for Ritetemp Thermostat 8082, 1 page, 2002.

Quick Start Guide for Ritetemp Thermostat 8082, 1 page, 2002.

Install Guide Ritetemp Thermostat 8082, 6 pages, 2002.

Remote Control Power Requirement for Ritetemp Thermostat 8082, 1 page, 2002.

Mounting Template for Ritetemp Thermostat 8082, 1 page, 2002.

* cited by examiner

GRAPHICAL USER INTERFACE SYSTEM FOR A THERMAL COMFORT CONTROLLER

This application is a continuation of prior U.S. application Ser. No. 09/697,633, filed Oct. 26, 2000, now U.S. Pat. No. 6,595,430.

BACKGROUND OF THE INVENTION

The present invention relates to thermostats and other thermal comfort controllers and particularly to a graphical user interface for such thermal comfort controllers.

Current thermal comfort controllers, or thermostats, have a limited user interface which typically includes a number of data input buttons and a small display. Hereinafter, the term thermostat will be used to reference a general comfort control device and is not to be limiting in any way. For example, in addition to traditional thermostats, the present such control device could be a humidistat or used for venting control. As is well known, thermostats often have setback capabilities which involves a programmed temperature schedule. Such a schedule is made up of a series of time-scheduled set-points. Each set-point includes a desired temperature and a desired time. Once programmed with this temperature schedule, the controller sets-up or sets-back the temperature accordingly. For example, a temperature schedule could be programmed so that in the winter months, a house is warmed to 72 degrees automatically at 6:00 a.m. when the family awakes, cools to 60 degrees during the day while the family is at work and at school, re-warms to 72 degrees at 4:00 p.m. and then cools a final time to 60 degrees after 11:00 p.m., while the family is sleeping. Such a schedule of lower temperatures during off-peak hours saves energy costs.

It is well known that users have difficulty using the current form of a user interface for thermostats because such an interface is not intuitive and is somewhat complicated to use. Therefore, users either do not utilize the energy saving programmable functions of the controller, or they do not change the schedule that is programmed by either the installer or that is the factory default setting.

Another limitation of the current user interfaces for thermostats is that once programmed, the temperature schedule cannot be easily reviewed. Usually, the display is configured to show one set-point at a time in a numerical manner. Using the input buttons, the user must 'page forward' to the next set-point in the schedule or 'page backward' to the previous set-point.

Although the user can, with difficulty, determine the temperature schedule that is programmed into the controller, the user cannot determine how closely this temperature schedule was followed. Of course, when a new set-point determines that the controller should either raise or lower the temperature in a house or other building, the temperature does not immediately change to that new temperature. It can take some time for the room or building to warm up or cool down to the desired temperature. The thermostat typically tracks this information to allow adjustment to be easily made. At present, the user has no way of viewing this information and no way of correlating the temperature schedule with actual house temperatures.

What is needed in the art is a user interface for a thermostat in which the temperature schedule is more easily programmed. The user interface should display a more user friendly representation of the schedule so that the user can review an entire day's schedule all at once. The user interface should also easily display alternative schedules, such as a weekend and weekday schedule. Further, the graphical representation should itself be the intuitive means to programming the schedule. The user interface should also be able to compare the temperature schedule against the actual historical temperature over a period of time.

SUMMARY OF THE INVENTION

This invention can be regarded as a graphical user interface system for thermal comfort controllers. In some embodiments, the user interface system is mounted on the wall as part of a thermostat. In other embodiments, the user interface system is a hand held computing unit which interfaces with a thermostat located elsewhere. The user interface system includes a central processing unit, a memory and a display with a touch-sensitive screen used for input. The memory stores at least one temperature schedule. The temperature schedule has at least one set-point, which associates a desired temperature to a desired time. The display graphically represents the temperature schedule and allows the user to easily and intuitively program the temperature schedule. The temperature schedule may be displayed as a step-function graph, as a listing of set-points, or as a clock and temperature control (such as a dial). In some embodiments, the display can also graphically represent the actual temperature history compared to the desired temperature schedule. In other embodiments, the temperature schedule can be displayed and changed in other graphical ways, such as with slider or scroll bar controls.

Several objects and advantages of the present invention include: the temperature schedule is more easily programmed than in past user interfaces; the step-function or other display is more informative and intuitive; historical data can be displayed to the user; and multiple schedules can be programmed.

DESCRIPTION OF PREFERRED EMBODIMENTS OF THE INVENTION

The present invention is a user interface system for a thermostat or other comfort controller. Throughout the drawings, an attempt has been made to label corresponding elements with the same reference numbers. The reference numbers include:

| Reference Number | Description |
| --- | --- |
| 100 | Central Processing Unit |
| 200 | Display Unit |
| 205 | Axis denoting Time |
| 210 | Axis denoting Temperature |
| 215 | Graphical Representation of Temperature Schedule |
| 220 | Graphical Representation of Temperature History |
| 225 | Other Data |
| 230 | Additional Controls |
| 235 | Buttons |
| 240 | Stylus |
| 300 | Memory |
| 400 | Temperature Schedule Data Structure |

-continued

| Reference Number | Description |
| --- | --- |
| 500 | Temperature History Data Structure |
| 600 | Set-Point |
| 700 | Actual-Temperature-Point |
| 800 | Conduits to Heating/Cooling Devices or Thermostat |

Figure 1:
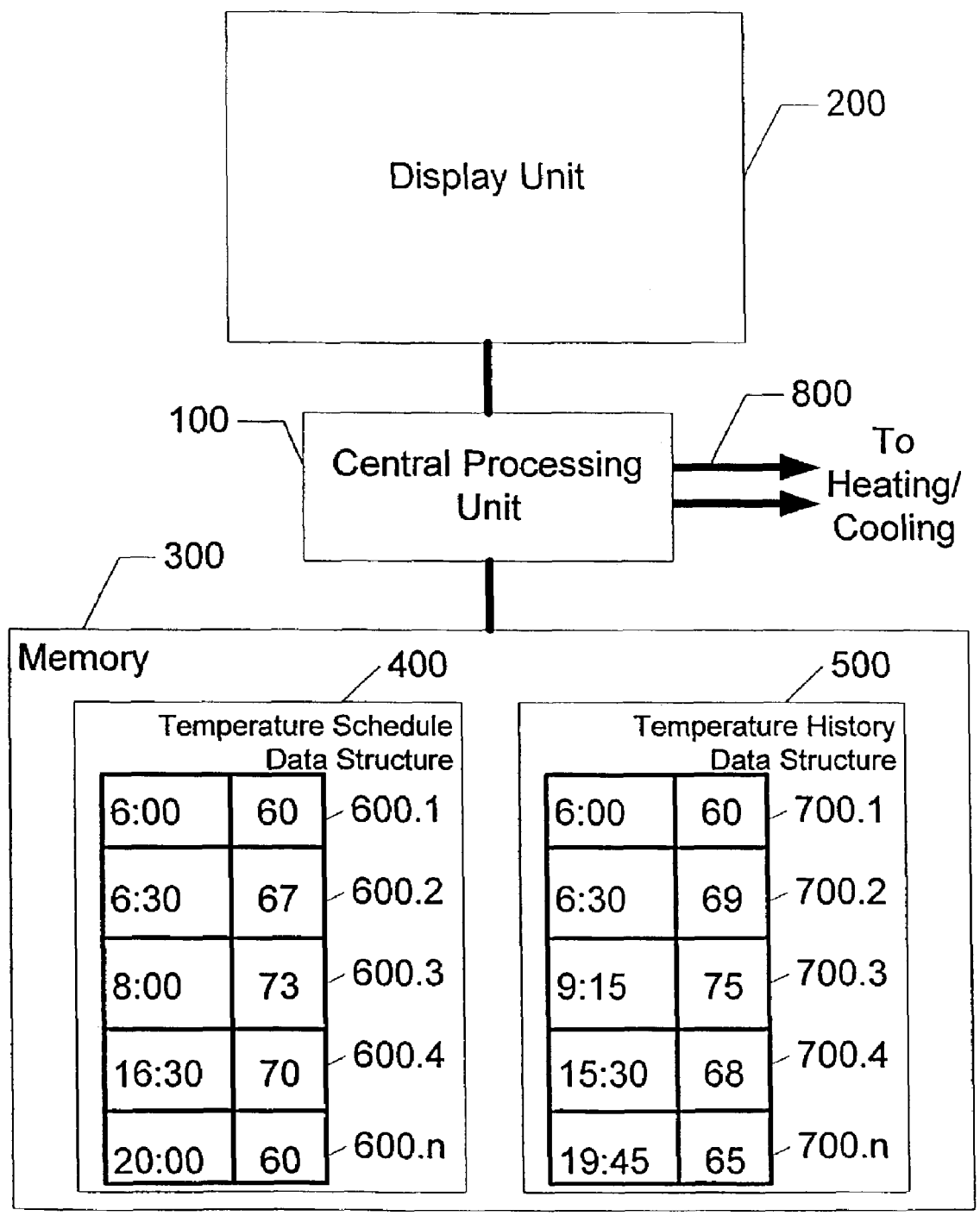
FIG. 1 is a block diagram of a user interface system for a thermal comfort controller.

Referring to the drawings, FIG. 1 is a block diagram of the user interface system for a comfort contoller. The user interface system includes a central processing unit 100. This central processing unit 100 is coupled to a display unit 200 and a memory 300. The display unit 200 has a touch-sensitive screen which allows the user to input data without the need for a keyboard or mouse. The memory 300 includes a temperature schedule data structure 400, which is made up of one or more set-points 600. The memory 300 may also include a temperature history data structure 500, which is made up of one or more Actual-Temperature-Points 700.

As previously mentioned, the display unit 200 includes a graphical display/touch sensitive screen. This configuration will provide for very flexible graphical display of information along with a very user friendly data input mechanism. The display unit 200 may be very similar to the touch screen display used in a hand-held personal digital assistant ("PDA"), such as a Palm brand PDA manufactured by 3Com, a Jornada brand PDA manufactured by Hewlett Packard, etc. Of course the graphical user interface system could also be manufactured to be integrated with a thermostat itself. In such an embodiment, a touch-sensitive LCD display is coupled with the thermostat's existing central processing unit and RAM.

The temperature schedule data structure 400 and temperature history data structure 500 are data structures configured and maintained within memory 300. For example, the temperature schedule data structure 400 and temperature history data structure 500 could be simple two-dimensional arrays in which a series of times are associated to corresponding temperatures. In FIG. 1, temperature schedule data structure 400 has been configured to adjust the temperature to 60 degrees at 6:00 a.m. (see 600.1), then to 67 degrees at 6:30 (see 600.2), and up to 73 degrees at 8:00 a.m. (see 600.3) etc. Temperature history data structure 500 is shown to store the information that at 6:00 a.m. the actual temperature was 60 degrees (see 700.1), and by 6:30 a.m., the temperature had risen to 69 degrees (see 700.2).

Of course, the temperature schedule data structure 400 and temperature history data structure 500 could also be more advanced data structures capable of organizing more data. For example, the temperature schedule data structure 400 could be configured to allow more than one schedule to be programmed. One schedule could be assigned to run from Monday through Friday while a second schedule could be assigned to run on Saturdays and Sundays. Alternately, different schedules could be assigned for each day of the week. Different schedules could be devised and stored for the summer months and winter months as well.

Temperature history data structure 500 could be configured to store more information, including historical information over a period of several days, weeks, or months. The data could be aggregated to show the average temperatures by time, day, or season. A person skilled in the art of computer programming could readily devise these data structures.

The user interface system also has conduits 800 to the heating/cooling devices or thermostats thereof so that user interface system can communicate with the thermostat or other comfort controller.

Figure 2:
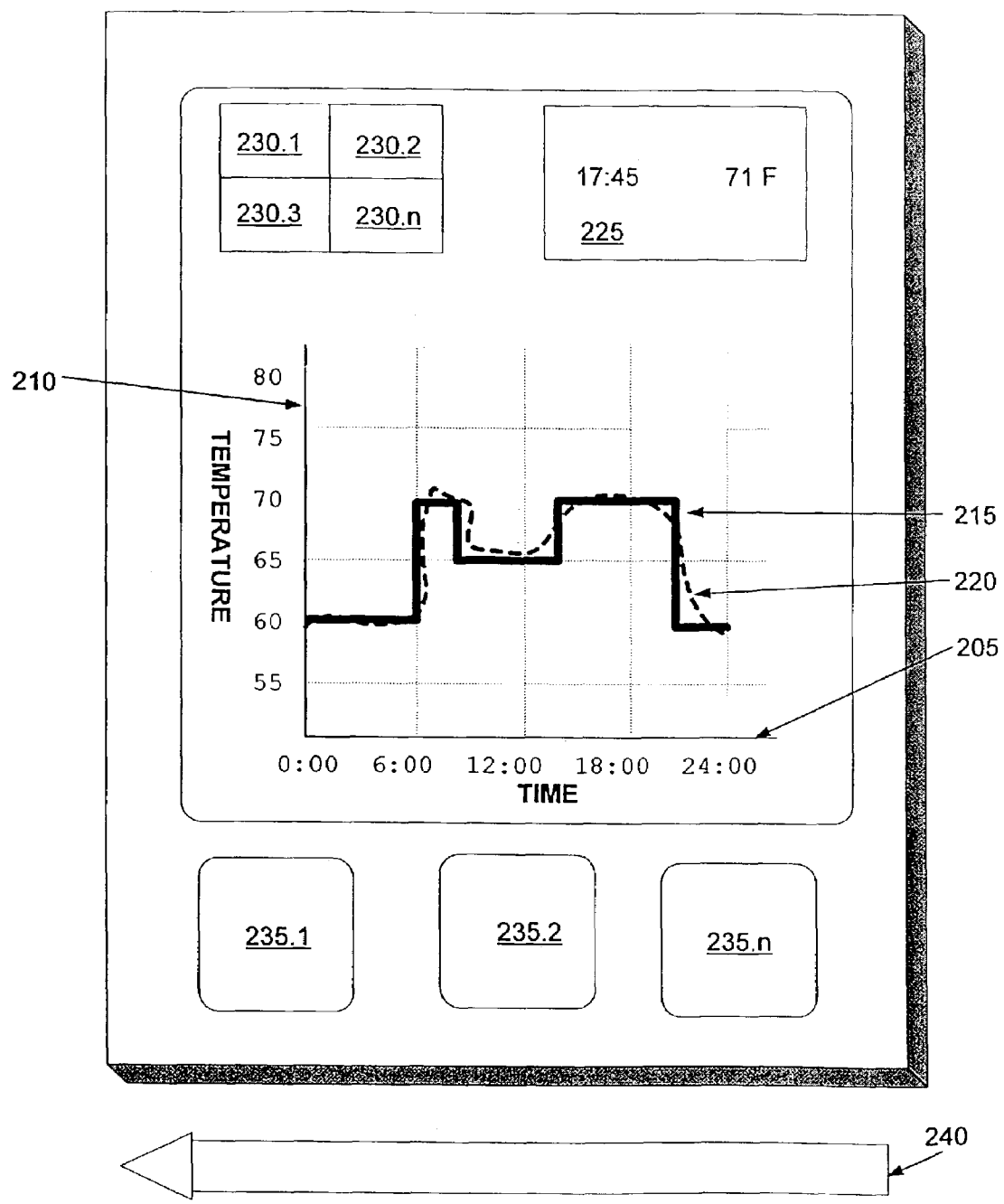
FIG. 2 is a perspective view of the user interface system in an embodiment with a stylus.

FIG. 2 shows a perspective view of one possible embodiment of the user interface system. In FIG. 2, the user interface system has been installed as an integral element of the thermostat wall unit. The display unit 200 of the user interface system displays the graphical representation of the temperature schedule 215 as well as the graphical representation of the temperature history graph 220. These graphical representations are presented as a graph in which one axis denotes time 205 and the other axis denotes temperatures 210. The graphical representation of the temperature schedule 215 is shown in FIG. 2 as a step function. Other data 225 is also displayed, which could be the current date, day of the week, time, indoor and/or outdoor relative humidity, indoor and/or outdoor temperature, etc. The display unit 200 could also represent the temperature schedule or history schedule in formats other than a function on a graph. For example, the temperature schedule could be shown as a listing of set-points. Or, the graph could be shown as a bar chart in which the length of the bars indicate the temperature.

The display unit 200 can also be configured with additional controls 230, which could, for example, switch the display between Fahrenheit and Celsius for the temperature, between standard and military time, and between showing a single day's schedule versus showing a week's schedule. In addition to the controls programmed and displayed on display unit 200, physical buttons of the thermostat 235 could be programmed to be used for working with the user interface system as well. This is similar to the operation of a PDA.

The graphical representations, controls and other data that are displayed on display unit 200 is accomplished by a computer program stored in memory 300. The computer program could be written in any computer language. Possible computer languages to use include C, Java, and Visual Basic.

The operation of the user interface system is more intuitive than previous user interfaces for other thermal comfort controllers. The various set-points 600 can displayed on the display unit 200 in a graphical format 215, such as in a step-function, bar chart, etc. In the step-function embodiment, which is shown in FIG. 2, each line portion of the step-function line corresponds to a set-point in the temperature schedule data structure 400. Because the display unit 200 is touch-sensitive, the user can use a finger or stylus 240 to "point-and-drag" any one of the vertical lines of the step-function, representing a time of day, to a different value to indicate a new time at which to change the temperature. Similarly, the user can use a finger or stylus 240 to "point-and-drag" any one of the horizontal lines, representing a temperature, to a different value to indicate a new temperature to be maintained by the controller during that time period. When the user changes the graphical representation of the temperature schedule 215, central processing unit 100 modifies the temperature schedule data structure 400 to reflect these changes.

In some embodiments, the buttons 235 or additional controls 230 can be configured so that the user can perform additional programming. For example, one of the buttons 235 or additional controls 230 might cause an alternate schedule to be displayed—such as one for the weekend—which the user can program. Or, pressing one of the buttons 235 or additional controls 230 might cause the temperature history 500 to be displayed by the display unit 200.

In other embodiments of the present invention, the temperature schedule 215 could be displayed in other formats. Again, the step-function shown in FIG. 2 is just one of several ways to graphically display the temperature schedule 215. It could also be shown as a list of set-points, showing the time and temperature for each set-point. Or, a scroll bar or slider bar control could be displayed in which the user simply adjusts the control to adjust the temperature. In such an embodiment, time could be displayed as a digital or analog clock, and the user could modify such a clock control along with the temperature control in order to modify an existing or create a new set-point.

There are many ways in which the user interface system can work with the thermal comfort controller. The user interface system would probably be integrated into a thermal comfort control system and installed on a wall much like current programmable thermostats. However, if the user interface system is configured on a hand-held PDA, the user-interface could communicate with the thermal comfort controller via the PDA's infra-red sensor. Or, the PDA could be synchronized with a personal computer and the personal computer could set the appropriate instructions to the thermal comfort controller. Or, the PDA could use a cellular/mobile phone feature to telephone the controller (i.e., thermostat, personal computer, etc.) to exchange pertinent and relevant data.

From the foregoing detailed description, it will be evident that there are a number of changes, adaptations and modifications of the present invention which come within the province of those skilled in the art. However, it is intended that all such variations not departing from the spirit of the invention be considered as within the scope thereof.

What is claimed is:

1. A method for programming a thermal comfort controller with a user interface system having a central processing unit, a memory means for storing a temperature schedule data structure having at least one set-point, where the set-points each associate a desired temperature to a desired time, and a display unit with a touch-sensitive screen, the memory means and the display unit both coupled to the central processing unit, the method comprising:
    displaying at least one set-points on the display unit;
    choosing the at least one set-point from the temperature schedule data structure;
    graphically displaying a clock control on the display unit and simultaneously graphically displaying a temperature control on the display unit;
    entering a set-time for the at least one set-point on the display unit by touching the clock control displayed on the display unit while also displaying the temperature control;
    entering a set-temperature for the at least one set-point on the display unit by touching the temperature control displayed on the display unit while also displaying the clock control; and
    updating the at least one set-point in the temperature schedule data structure with the set-time and the set-temperature.

2. The method for programming a thermal comfort controller from claim claim 1, wherein the step of displaying the at least one set-point are displayed as a step-function with a first axis for denoting time, and a second axis for denoting temperature.

3. The method for programming a thermal comfort controller from claim 2, wherein the step of entering the set-time comprises dragging a first graphical line of the step-function from its current location on the step-function to a previously presented position relative to the first axis.

4. The method for programming a thermal comfort controller from claim 2, wherein the step of entering the set-temperature comprises dragging a second graphical line of the step-function from its current location on the step-function to a previously presented position relative to the second axis.

5. The method for programming a thermal comfort controller from claim 1, wherein the user interface further comprises a stylus for allowing a user to program the set-points on the display unit.

6. The method for programming a thermal comfort controller from claim 1, further comprising:
    providing a temperature history data structure having at least one Actual Temperature-Point, where the Actual-Temperature-Points each associate an actual temperature to an actual time;
    displaying the temperature history data structure; and
    wherein the memory means stores the temperature history data structure.

7. The method for programming a thermal comfort controller from claim 6, wherein the step of displaying the temperature history data structure comprises displaying a list showing an actual time and an actual temperature for each Actual-Temperature-Point.

8. The method for programming a thermal comfort controller with a user interface system from claim 1, wherein the step of displaying at least one set-point comprises listing a first time and a first temperature associated to a first set-point.

9. The method for programming a thermal comfort controller with a user interface system from claim 8, wherein the step of displaying at least one set-point comprises listing a second time and a second temperature associated to a second set-point.

10. The method for programming a thermal comfort controller with a user interface system from claim 9, wherein the first set-point and the second set-point are displayed simultaneously on the display unit.

11. The method for programming a thermal comfort controller with a user interface system from claim 9, wherein the first set-point and the second set-point are displayed in turn on the display unit.

12. The method for programming a thermal comfort controller with a user interface system from claim 1, wherein the temperature control includes a scroll bar.

13. The method for programming a thermal comfort controller with a user interface system from claim 1, wherein the temperature control includes a slider bar.

14. The method for programming a thermal comfort controller with a user interface system from claim 1, wherein the temperature control includes an icon representing a temperature increase and an icon representing a temperature decrease.

15. The method for programming a thermal comfort controller with a user interface system from claim 1, wherein the clock control includes an icon representing a time increase and an icon representing a time decrease.

16. The method for programming a thermal comfort controller with a user interface system from claim 1, wherein the clock control includes a representation of a digital clock, wherein the time on the digital clock is changeable by the user.

17. The method for programming a thermal comfort controller with a user interface system from claim 1, wherein the clock control includes a representation of an analog clock, wherein the time on the analog clock is changeable by the user.

18. The method for programming a thermal comfort controller with a user interface system from claim 1, wherein the temperature control includes a dial.

19. The method for programming a thermal comfort controller with a user interface system from claim 1, further comprising entering a day.

20. The method for programming a thermal comfort controller with a user interface system from claim 1, further comprising packaging the user interface system for a consumer, wherein the step of packaging is after the step of updating.

21. The method for programming a thermal comfort controller from claim 1, wherein the temperature schedule data structure has a plurality of set-points, each associated to a period of a day.

22. The method for programming a thermal comfort controller from claim 21, wherein a set of four set-points from the plurality of set-points represent four periods in a day;
wherein a first set-point is representative of a wake period, a second set-point is representative of a leave period, a third set-point is representative of a return period, and a fourth set-point is representative of a sleep period.

23. The method for programming a thermal comfort controller from claim 22, wherein the set of four set-points represent periods in a weekday; and
wherein a second set of two set-points from the plurality of set-points represent a wake period and a sleep period for a weekend day.

24. The method for programming a thermal comfort controller from claim 22, wherein the set of four set-points represent periods for Monday;
wherein a second set of four set-points represent a wake period, leave period, return period and sleep period for Tuesday;
wherein a third set of four set-points represent a wake period, leave period, return period and sleep period for Wednesday;
wherein a fourth set of four set-points represent a wake period, leave period, return period and sleep period for Thursday; and
wherein a fifth set of four set-points represent a wake period, leave period, return period and sleep period for Friday.

25. The method for programming a thermal comfort controller from claim 24, wherein a sixth set of four set-points represent a wake period, leave period, return period and sleep period for Saturday; and
wherein a seventh set of four set-points represent a wake period, leave period, return period and sleep period for Sunday.

26. The method for programming a thermal comfort controller from claim 24, wherein a sixth set of two set-points represent a wake period and sleep period for Saturday; and
wherein a seventh set of two set-points represent a wake period and sleep period for Sunday.

27. The method for programming a thermal comfort controller from claim 21, wherein a user may choose a number of periods for a day.

28. A method for programming a thermal comfort controller with a user interface system having a central processing unit, a memory means for storing a temperature schedule data structure having at least one set-point, where the set-points each associate a desired temperature to a desired time, and a display unit with a touch-sensitive screen, the memory means and the display unit both coupled to the central processing unit, the method comprising:

displaying at least one set-point including a first set point on the touch sensitive screen of the display unit, wherein the step of displaying the at least one set-point comprises listing a first time and a first temperature associated with the first set point on the touch sensitive screen;
simultaneously displaying a time control and a temperature control on the touch sensitive screen while a set-time and a set-temperature are entered for the first set-point;
entering the set-time for the first set-point by touching the time control displayed on the touch sensitive screen;
entering the set-temperature for the first set-point by touching the temperature control displayed on the touch sensitive screen; and
updating the first set-point in the temperature schedule data structure with the set-time and the set-temperature.

29. The method for programming a thermal comfort controller with a user interface system from claim 28, wherein the temperature control includes a scroll bar.

30. The method for programming a thermal comfort controller with a user interface system from claim 28, wherein the temperature control includes a slider bar.

31. The method for programming a thermal comfort controller with a user interface system from claim 28, wherein the temperature control includes an icon representing a temperature increase and an icon representing a temperature decrease.

32. The method for programming a thermal comfort controller with a user interface system from claim 28, wherein the clock control includes an icon representing a time increase and an icon representing a time decrease.

33. The method for programming a thermal comfort controller with a user interface system from claim 28, wherein the clock control includes a representation of a digital clock, wherein the time on the digital clock is changeable by the user.

34. The method for programming a thermal comfort controller with a user interface system from claim 28, wherein the clock control includes a representation of an analog clock, wherein the time on the analog clock is changeable by the user.

35. The method for programming a thermal comfort controller with a user interface system from claim 28, wherein the temperature control includes a dial.

36. A thermal comfort controller, comprising:
a memory for storing a temperature schedule data structure having at least one set-point, where the set-points each associate a desired temperature to a desired time;
a display unit;
a controller in communication with the display unit and the memory, the controller programmed to:
graphically display a clock control on the display unit and simultaneously graphically display a temperature control on the display unit;
accept a set-time input by sensing one or more touches of the clock control on the display unit, wherein the set-time input corresponds to a desired time for at least one set-point;
accept a set-temperature input by sensing one or more touches of the temperature control on the display, wherein the set-temperature input corresponds to a desired temperature for at least one set-point; and
update the at least one set-point in the temperature schedule data structure with the set-time and the set-temperature.

* * * * *